Patented Jan. 5, 1954

2,665,274

UNITED STATES PATENT OFFICE 2,665,274

STEROID PYRIDINIUM SALTS

John P. Conbere, Plainfield, N. J., assignor to Merck & Co., Inc., Rahway, N. J., a corporation of New Jersey No Drawing. Application April 30, 1952, Serial No. 285,329

13 Claims. (Cl. 260—239.5)

1

This invention relates to novel quaternary ammonium salts of cyclopentanopolyhydrophenanthrene compounds and processes of obtaining the same; more particularly, it is concerned with new pyridinium salts derived from cortisone, ($\Delta^4$-17$\alpha$,21-dihydroxy-3,11,20-triketopregnene) and hydrocortisone, ($\Delta^4$-11$\beta$,17$\alpha$,21-trihydroxy-3,20-diketopregnene) and methods for the preparation of these salts.

Cortisone and hydrocortisone, and in particular the 21-acetoxy derivatives thereof, have been found to be very effective in the treatment of rheumatoid arthritis.

The new quaternary ammonium salts derived from cortisone and hydrocortisone, which may be represented as follows:

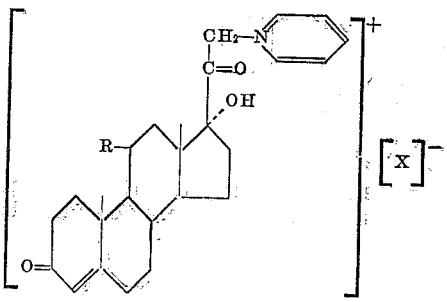

wherein R is a keto or hydroxy group and X is an anion from the group consisting of halides and aromatic sulfonic acid radicals, are useful as intermediates in the preparation of other novel compounds having cortisone-like activity. For example, as disclosed in copending application Serial No. 285,318, filed April 30, 1952, these pyridinium salts may be utilized in the preparation of $\Delta^4$-17$\alpha$-hydroxy-3,11,20-triketo-21-pregnenal and $\Delta^4$-11$\beta$,17$\alpha$-dihydroxy-3,20-diketo-21-pregnenal.

It is an object of the present invention to provide novel 21-pyridinium salts derived from cortisone and hydrocortisone. Another object is to provide processes for the preparation of these salts from cortisone and hydrocortisone. Other objects will be apparent from the detailed description hereinafter provided.

In accordance with my present invention, it is now found that these valuable pyridinium derivatives of cortisone and hydrocortisone are conveniently prepared by reacting cortisone or hydrocortisone with pyridine in the presence of an aromatic sulfonyl halide. This reaction may be shown as follows:

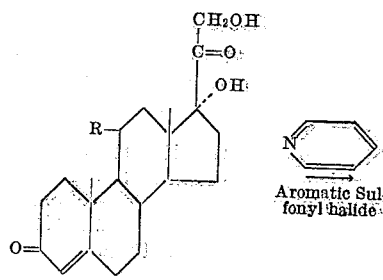

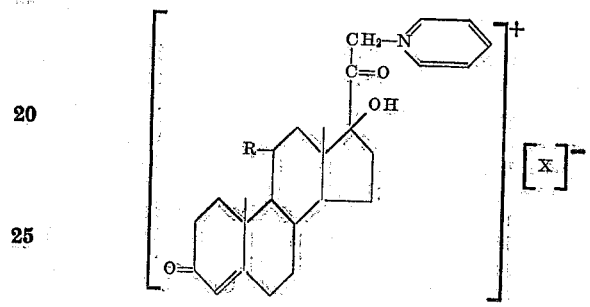

wherein R represents a keto or hydroxyl group and X represents an anion from the group consisting of halides and aromatic sulfonic acid radicals.

This reaction is conveniently effected by dissolving cortisone or hydrocortisone in pyridine and adding thereto an aromatic sulfonyl halide (inter alia benzene sulfonyl chloride, naphthalene sulfonyl bromide, toluene sulfonyl chloride, toluene sulfonyl bromide, benzene sulfonyl bromide, naphthalene sulfonyl chloride, and the like). The resulting reaction mixture is then permitted to stand at room temperature for sufficient time to complete the reaction. The reaction results in the formation of a mixture of the 21-pyridinium aromatic sulfonate and 21-pyridinium halide derivatives of cortisone and hydrocortisone.

Thus, pursuant to a specific embodiment of this procedure p-toluenesulfonyl chloride may be reacted with cortisone in pyridine at room temperature until completion of the reaction. The reaction results in the formation of a mixture of $\Delta^4$-17$\alpha$-hydroxy-3,11,20-triketopregnenyl-21- pyridinium p-toluene sulfonate and $\Delta^4$-17α-hydroxy - 3,11,20 - triketopregnenyl - 21 - pyridinium chloride. The 21-pyridinium chloride derivative may be obtained from the reaction mixture by separating the solid formed and washing with acetone. By concentrating the reaction mixture to dryness under reduced pressure, triturating the residue with acetone, and filtering off the solid a mixture of the 21-pyridinium p-toluenesulfonate and 21-pyridinium chloride derivatives of cortisone is obtained from which the 21-pyridinium p-toluenesulfonate derivative is obtained by fractional crystallization from a suitable solvent such as methanol or ethanol.

The following examples are presented as illustrative embodiments of my invention:

EXAMPLE 1

*Preparation of $\Delta^4$-17α-hydroxy-3,11,20-triketopregnenyl-21-pyridinium p-toluenesulfonate*

Cortisone (3.6 g.) was reacted with p-toluenesulfonyl chloride (2.4 g.) in pyridine (50 ml.) and allowed to stand in the dark for 12 days.

The reaction mixture was pumped to dryness and 30 ml. of acetone was added to the residue. After standing overnight the solid was recovered by filtration and dissolved in methanol, treated with charcoal, diluted with 100 ml. of 95% ethanol and concentrated to 70 ml., cooled, the crystals collected and air dried to give 3.3 g. of product, M. P. 285–290° C. (d.).

Calc. for $C_{33}H_{39}O_7NS$: C, 66.75; H, 6.67. Found: C, 66.58; H, 6.70.

The 21-pyridinium-p-toluenesulfonate derivative of hydrocortisone ($\Delta^4$-11β,17α-dihydroxy-3,20-diketopregnenyl-21-pyridinium p - toluenesulfonate) prepared in this manner from hydrocortisone is found to melt at 295–296° C.

EXAMPLE 2

*Preparation of $\Delta^4$-17α-hydroxy-3,11,20-triketopregnenyl-21-pyridinium chloride*

Cortisone (3.6 g.) was reacted with p-toluenesulfonyl chloride (2.4 g.) in pyridine (50 ml.) and allowed to stand in the dark for 12 days.

The solid was collected and washed with acetone to give 4.4 g. of the desired product, M. P. 284–287° C. The solid was recrystallized from methanol-ether to give 3.3 g. of cortisone-21-pyridinium chloride, M. P. 291–294° C. (d.).

On reacting a solution of the 21-pyridinium chloride derivative of cortisone prepared above with silver nitrate a precipitate of silver chloride is obtained.

EXAMPLE 3

*Preparation of $\Delta^4$-11β,17α-dihydroxy-3,20-diketo-21-pyridinium chloride*

Hydrocortisone (100 mg.) was dissolved in 2 ml. anhydrous pyridine and treated with 65 mg. p-toluenesulfonyl chloride at room temperature for 24 hours. The reaction mixture was concentrated to dryness at 60° C. in vacuo and the residue triturated with 5 ml. acetone. The solid was collected and air dried to give 56 mg. of product, M. P. 295–300° C. A portion of the solid 21-pyridinium chloride derivative of hydrocortisone was recrystallized from methanol-ether.

Calc. for $C_{26}H_{34}O_4NCl$: C, 67.88; H, 7.45. Found: C, 67.37; H, 7.16.

Various changes and modifications may be made in carrying out the present invention without departing from the spirit and scope thereof. Insofar as these changes and modifications are within the scope of the appended claims, they are to be considered as part of this invention.

I claim:

1. $\Delta^4$-17α-hydroxy-3,11,20-triketopregnenyl-21-pyridinium p-toluenesulfonate having the formula 2. $\Delta^4$-11β,17α-dihydroxy-3,20-diketopregnenyl-21-pyridinium p-toluenesulfonate having the formula 3. $\Delta^4$-17α-hydroxy-3,11,20-triketopregnenyl-21-pyridinium chloride having the formula 4. $\Delta^4$-11β,17α-dihydroxy-3,20-diketopregnenyl-21-pyridinium chloride having the formula 5. A pyridinium salt of the formula:

wherein R is a substituent from the group consisting of keto and hydroxy, and X is an anion from the group consisting of halides and aromatic sulfonic acid radicals.

6. The process which comprises reacting cortisone with pyridine in the presence of p-toluenesulfonyl chloride, concentrating the resulting reaction mixture to dryness, triturating the residue so obtained with acetone, recovering the solid product from said acetone slurry, and crystallizing said solid from a lower aliphatic alcohol to obtain $\Delta^4$-17α-hydroxy-3,11,20-triketopregnenyl-21-pyridinium p-toluenesulfonate.

7. The process which comprises reacting cortisone with pyridine in the presence of p-toluenesulfonyl chloride, recovering the solid product from the resulting reaction mixture, and washing said solid product with acetone to obtain $\Delta^4$-17α-hydroxy-3,11,20-triketopregnenyl-21 - pyridinium chloride.

8. The process which comprises reacting hydrocortisone with pyridine in the presence of p-toluenesulfonyl chloride, concentrating the resulting reaction mixture to dryness, triturating the residue so obtained with acetone, and recovering the solid $\Delta^4$-11β,17α-dihydroxy-3,20-diketo-21-pyridinium chloride from said acetone slurry.

9. The process which comprises reacting cortisone with pyridine in the presence of p-toluenesulfonyl chloride to form a mixture of $\Delta^4$-17α-hydroxy-3,11,20-triketopregnenyl-21 - pyridinium chloride and $\Delta^4$-17α-hydroxy-3,11,20-triketopregnenyl-21-pyridinium p-toluenesulfonate.

10. The process which comprises reacting hydrocortisone with pyridine in the presence of p-toluenesulfonyl chloride to form a mixture of $\Delta^4$-11β,17α-dihydroxy-3,20- diketopregnenyl - 21 - pyridinium chloride and $\Delta^4$-11β,17α-dihydroxy-3,20-diketopregnenyl-21-pyridinium p-toluenesulfonate.

11. The process which comprises reacting cortisone with pyridine in the presence of an aromatic sulfonyl halide to form a mixture of the 21-pyridinium halide and the 21-pyridinium aromatic sulfonate, derivatives of cortisone, and separating said halide and aromatic sulfonate salts.

12. The process which comprises reacting hydrocortisone with pyridine in the presence of p-toluenesulfonyl chloride to form a mixture of $\Delta^4$-17α-hydroxy-3,11,20-triketopregnenyl-21-pyridinium chloride and $\Delta^4$-17α-hydroxy-3,11,20-triketopregnenyl-21-pyridinium p-toluenesulfonate.

13. The process which comprises reacting a compound of the formula:

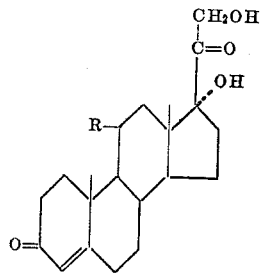

wherein R is a substituent from the group consisting of keto and hydroxy, with pyridine in the presence of an aromatic sulfonyl halide to form a mixture of the halide and aromatic sulfonate salts of the resulting 21-pyridinium compound.

JOHN P. CONBERE.

No references cited.